Nov. 22, 1960   F. A. MARTIN   2,961,007
FLEXIBLE HOSE
Original Filed Nov. 24, 1954   2 Sheets-Sheet 1
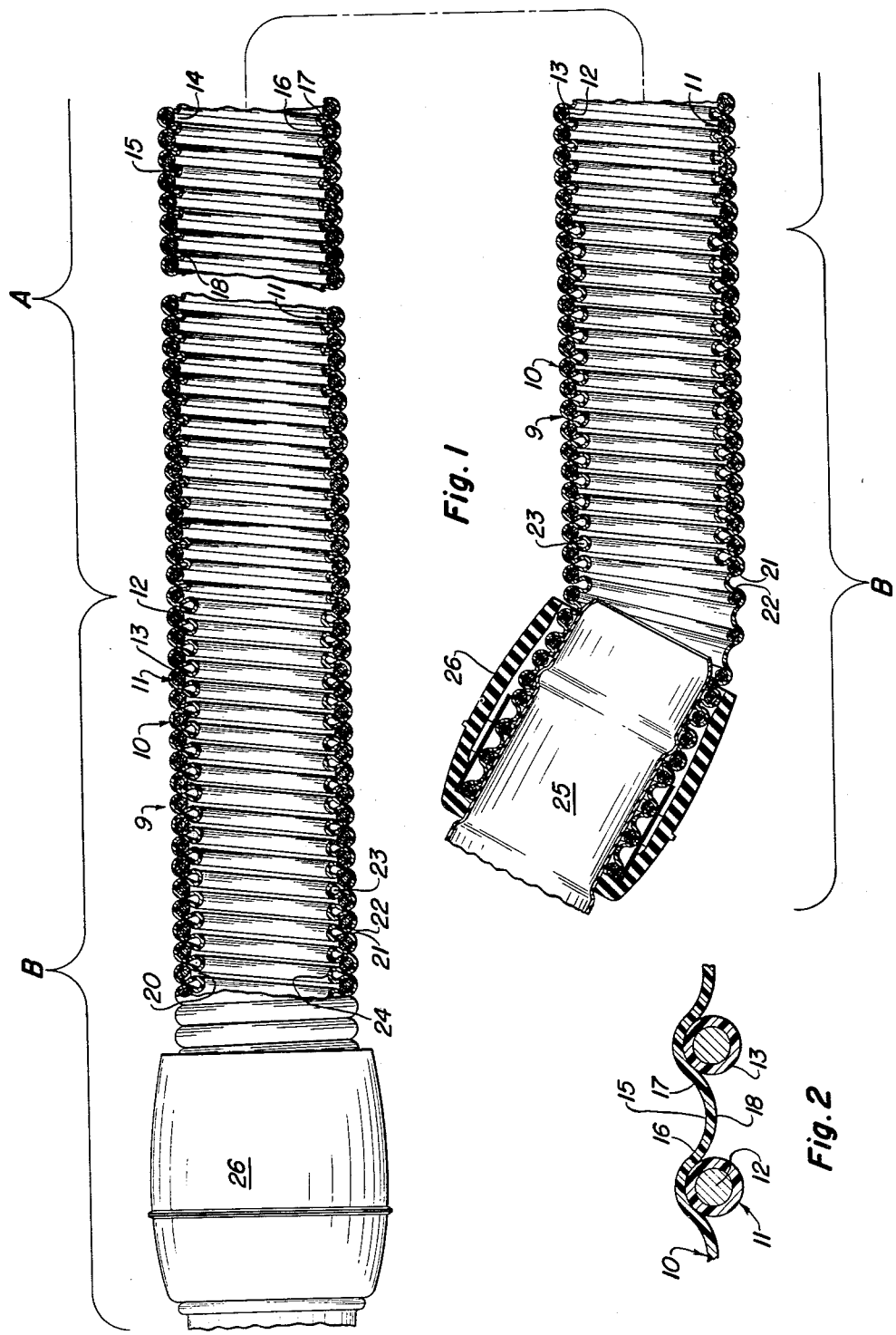

Nov. 22, 1960 F. A. MARTIN 2,961,007
FLEXIBLE HOSE
Original Filed Nov. 24, 1954 2 Sheets-Sheet 2
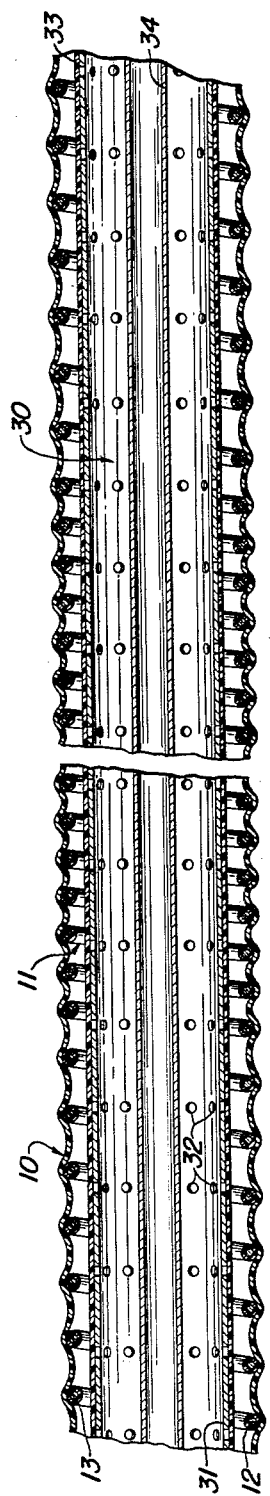
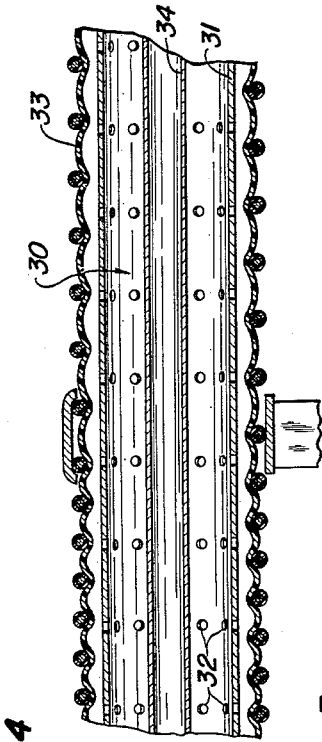
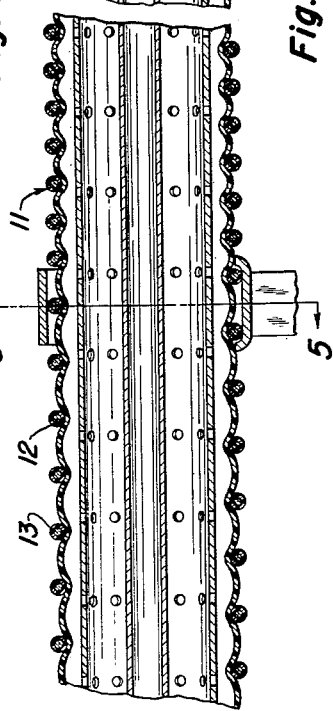
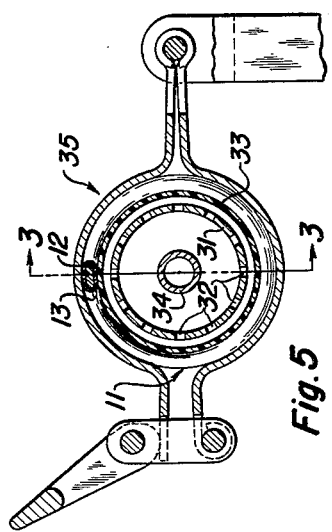

United States Patent Office 2,961,007
Patented Nov. 22, 1960

2,961,007

FLEXIBLE HOSE

Frank A. Martin, Akron, Ohio, assignor to The Hoover Company, North Canton, Ohio, a corporation of Ohio Continuation of application Ser. No. 470,894, Nov. 24, 1954. This application Dec. 6, 1955, Ser. No. 551,383

3 Claims. (Cl. 138—56)

This application is a continuation of my copending application, Serial No. 470,894, filed November 24, 1954, now abandoned.

The present invention relates to flexible hose and more particularly to an extensible hose for use with suction cleaners.

This invention is an improvement over an extensible hose disclosed and claimed in an application by Jack E. Duff, Serial No. 415,256, filed March 10, 1954, now U.S. Patent No. 2,739,616, dated March 27, 1956.

According to the Duff application an extensible hose is formed from a thin-walled tube of thermoplastic material reinforced by a cylindrical spirally wound reinforcing element with the reinforcing element lying a deep inwardly facing spiral fold or valley extending the entire length of the finished hose with an outwardly facing spiral fold or valley lying in between adjacent turns of the spiral reinforcing element, with the walls connecting the two folds or valleys lying in substantial contact with each other and in contact with adjacent turns of the reinforcing element and with the inner edges or lands of the outwardly facing fold normally lying within the inner periphery of the spirally wound reinforcing element. The opposed walls which form the outwardly facing fold form substantially closed end loops which are substantially closed between the turns of the coil and spaced apart inwardly thereof so as to form excess material between and inwardly of the turns of the coil which merely unfold or flatten out when the turns of the coil are separated. Such a hose is readily extensible because the walls of the outwardly facing fold need only be flattened out when the hose is stretched.

The Duff hose is formed by first forming a closely coiled cylindrical spirally wound reinforcing element with its turns pressing against each other. The closely coiled reinforcing element is then placed on a mandrel or arbor and stretched lengthwise to from two to four times its closely wound length and the end coils clamped or anchored in a fixed position relative to the mandrel with the turns of the reinforcing element being equally spaced along the arbor.

A thin-walled tube of thermoplastic material having an inside diameter less than that of the coiled reinforcing element is then blown over the mandrel and stretched reinforcing element and deflated to anchor the turns of the reinforcing element in their equally spaced position.

The end turns of the reinforcing element are then released to permit the latter to contract lengthwise, a distance permitted by the wall of the thermoplastic tube which forms a spirally corrugated carcass about two-thirds the length of the coil in its fully stretched condition. The carcass is then removed from the mandrel and placed in a bath of warm water which releases the stresses in the tube walls and permits the carcass to contract further with the turns of the coil being separated only by the walls of an outwardly facing spiral fold or valley in the tube wall, the carcass being about one-fourth the length of the fully stretched reinforcing element. The carcass is then permitted to cool to room temperature and the wall of the thermoplastic tube takes a permanent set in its above described position.

The Duff tube has been found very satisfactory being very flexible and extensible up to four times its static contracted position. However, with such a hose it is necessary that fittings be attached to its ends in order that its ends may be attached to complementary fittings, for example, to a suction cleaner at one end and to a cleaning tool at the other end.

It has been found in practice that under those conditions, when the hose is flexed sharply about the end of such a fitting that the turns of the reinforcing element are sometimes displaced from one fold or valley to an adjacent one with the result that the usefulness of the hose is impaired.

It has been found that if the fold is made deeper at the ends where the hose is attached to the fitting that the turns of the reinforcing element will not be displaced from one corrugation to another.

Additionally, it has been found in practice that the finished hose should be more flexible and extensible at its ends because a continuous extension and flexure takes place at those points.

It has also been found in practice that if the spiral folds are made deeper at the ends of the hose so as to form larger closed end loose loops at the ends that the above described disadvantages would be materially reduced or entirely eliminated.

The hose of the present invention provides deeper closed end loose loops at the end of the hose where the fittings are attached and thus eliminates the cause of prior failures.

It is also within the purview of the present invention that the folds or valleys be made deeper at other sections of the hose than at the ends if it is desired to make a hose having more flexibility and extensibility at such points. For example, under certain conditions it may be desirable that only one end of the hose be made more flexible and extensible.

Other objects and advantages of the present invention will become apparent as the description proceeds when taken in connection with accompanying drawings in which:

Fig. 1 is a sectional view of the hose of the present invention,

Fig. 2 is a fragmentary view of a section of the hose of Fig. 1 showing how the walls of the hose appear when in stretched condition, Fig. 3 is a sectional view of one form of apparatus by which the hose of the present invention may be made showing a preliminary stage in the manufacture of the hose, Fig. 4 is a view similar to Fig. 3 showing the apparatus for forming a hose according to the present invention at a later stage in the manufacture of the hose, and Fig. 5 is a sectional view of a clamp for anchoring certain turns of the reinforcing element during a preliminary stage in the manufacture of the hose of the present invention.

The hose of the present invention, generally indicated by the reference numeral 9, is shown in Fig. 1, and comprises a thermoplastic tube 10, for example, made from an elastomeric thermoplastic such as a polyvinyl chloride material and a cylindrical spirally wound reinforcing element or coil generally indicated by the reference numeral 11. The reinforcing element 11 comprises a reinforcing wire 12 and a sheath 13 surrounding the wire 12 and preferably also made of a thermoplastic material similar to that from which the tube 10 is made. The tube has an original inside diameter less than that of coil 11.

The hose 9 comprises a long central section A and shorter end sections B. At the central section A the reinforcing element 11 lies in, and is unattached to, an inwardly facing spiral fold or valley 14, between the turns of which lies a comparatively deep outwardly facing spiral fold or valley 15. The walls 16 and 17 connecting folds 14 and 15 normally substantially abut against each other and separate adjacent turns of the reinforcing element 11, the element 11 being prestressed so that its turns tend to lie against each other when free to do so.

The walls 16 and 17 are in substantial contact with each other between the turns of the coil 11 and are spaced from each other inwardly of the turns of the coil to form closed end loops having an excess of material which may be unfolded or straightened out when the turns of the coil 11 are straightened out.

The inner edges of loops 18 forming the inner wall of the fold or valley 15 lie inwardly of the periphery of the reinforcing element 11 so that in stretching the central section A it is merely necessary to straighten out the walls 16 and 17 of fold 15, while the turns of the reinforcing element 11 remain in the pockets formed by the inwardly facing valley 14. Upon release the hose 9 will return to its fully contracted position, as shown, due to the tendency of the coils of the reinforcing element to return into contact with each other. The turns of the reinforcing element are loosely retained within the fold or valley 14 except for being trapped therein by the walls 16 and 17 between the folds by the frictional resistance between the turns of the coil 11 and the walls 16 and 17 and the tendency of the tube 10 to return to its original diameter.

At the end sections B the reinforcing element 11 lies in an inwardly facing spiral fold or valley 20 which forms a continuation of fold or valley 14 of the central section A. Walls 21 and 22, which form an outwardly facing spiral valley or fold 23 between fold or valley 20, abut substantially against each other and separate the turns of the reinforcing element 11. The fold or valley 23 forms a continuation of the fold or valley 15 of the central section A. However, the fold or valley 23 is deeper than fold or valley 15 and its inner closed end loops 24 lie substantially radially inwardly of the inner loops 18 of the fold or valley 15 of the central section A.

The walls 21 and 22 which form the fold 23 are also substantially closed between the turns of coil 11 and are spaced apart inwardly of the turns to form a greater amount of excess material between the turns than at section A, which material is unfolded or straightened out as the turns are moved apart.

In stretching or flexing the end sections B the walls 21, 22 merely straighten out and when released will return to their deeply folded position shown. The turns of the coil 11 are effectively trapped by the pockets formed by the valley 20 but are otherwise loosely mounted therein except for frictional resistance between the tube 10 and sheath 13 in the same manner as at section A except that the pockets are deeper and offer more resistance to displacement of the turns of coil 11 from their pockets.

Suitable fittings including an inner nipple 25 and a protecting sleeve 26 are provided at the ends of the sections B so that one end of the hose 9 may be attached to a suction cleaner and the other to any suitable suction cleaning tool.

Fig. 2 shows how the walls 16 and 17 of fold or valley 15 flatten out to unfold loops 18 and permit the central section A to be stretched or extended to three or four times its static unextended normal length, the amount of stretch depending upon the stretch given to the reinforcing element 11 during the manufacture of the hose as will presently appear.

The right-hand end section B shows how the walls 21 and 22 of fold or valley 23 straighten out to unfold loops 24 on the outside of the bend when the hose is flexed about the end of the nipple 25. Since the valley 23 is deeper than the valley 15 of the central section A, a sharper bend can be made at the ends without displacing the turns of the reinforcing element 11 from the pockets formed by valley 20.

The hose 9 may be made by the apparatus of Figs. 3, 4 and 5 which is more particularly described in my co-pending application, Serial No. 551,382, filed December 6, 1955, now Patent No. 2,797,730 dated July 2, 1957.

A mandrel or arbor upon which the hose may be formed is generally indicated by the reference numeral 30 and comprises a hollow tube 31 having apertures 32 thru its walls, an expansible or inflatable tube 33 sealed at its ends to the tube 31 and a central air tube 34.

In making the hose 9 the reinforcing wire 12 may be precoiled so that its turns press against each other and the thermoplastic sheath 13 thereafter applied in any manner known in the art. Alternatively, the sheath 13 may be first applied to the wire 12 by extrusion or otherwise and the reinforcing element 11 thereafter closely coiled so that its turns press against each other.

The closely coiled reinforcing element 11 is then placed on the mandrel or arbor 30 while the tube 33 is deflated and the coil 11 stretched lengthwise to three or four times its original length, the amount of stretch depending upon the flexibility and extensibility of the hose desired, care being taken that the turns of the reinforcing element are evenly spaced along the length of the arbor 30. The reinforcing element 11 may be thus applied to the arbor by holding one end coil in a fixed position relative to one end of the arbor 30, stretching the reinforcing element 11 to the desired length and fixing the other end coil relative to the other end of the arbor 30.

A turn of the reinforcing element 11 at the junction between each end section B and the central section A, about thirty turns from the ends of the coil, is then moved axially away from the end of the mandrel 30 and clamped in a fixed position relative to the mandrel 30 by the fixture 35 shown in Fig. 5 and at line 5—5 of Fig. 3.

The turns of the reinforcing element 11 for the end sections B will then be spaced wider apart than those for the central section A. The differential spacing may vary but it has been found that an end spacing of approximately 0.55" and a central spacing of approximately 0.40" is satisfactory.

Air under pressure is then introduced between the tubes 31 and 34 which will flow thru openings 32 and inflate the tube 33, the ends of which are suitably sealed to tube 31 as more particularly described in my above mentioned co-pending application. As the tube 33 is inflated it will expand outwardly and contact the turns of the reinforcing element and anchor them in their differentially spaced position. That condition is clearly shown in Fig. 3. Since the turns of the coil are anchored interiorly by the expansible tube 33 the exterior clamps including those at the ends of arbor 30 and clamps 35 may be released.

The normal inside diameter of tube 10 is substantially less than that of the stretched reinforcing element 11. One end of a length of tubing 10, is then clamped shut and its other end slid over the end of tube 33 and the stretched reinforcing element 11. Air under pressure is then introduced in the tube 34 so as to inflate the tube 10. As the air is applied the length of tubing 10 is slid over the tube 33 and stretched reinforcing element 11 so as to encompass the entire length of the reinforcing element 11 in its extended condition the length of tubing 10 stretching lengthwise in the process. The air pressure in tube 34 is then released to deflate tube 10 and it will contract about the turns of reinforcing element 11 and clamp them in their differentially spaced position. The wall of tube 10 will also come into contact with the wall of tube 33 between the turns of the reinforcing element 11 to form the beginning of what will eventually become the outwardly facing folds or valleys 15 and 23.

The air pressure is then released from between tubes 31 and 34 to deflate the expansible tube 33 of mandrel 30. The reinforcing element 11 being prestressed, so that its turns tend to return into contact with each other, will contract lengthwise as far as permitted by the walls of the tube 10. At the same time the wall of tube 10 will move inwardly between the turns of the reinforcing element 11 as far as permitted and thus deepen the partially formed folds or valleys 15 and 23.

It has been found that by using a reinforcing element 207 inches long when in stretched condition that the carcass will contract to a length of approximately 100 inches when the end turns of the reinforcing element are thus released.

The carcass thus formed is then removed from the arbor 30 and immersed in a bath of warm water at from 150° to 180° F. for a few minutes. The heat thus applied will release the stresses in the tube 10 and soften it to permit the reinforcing element 11 to contract still further to the position shown in Fig. 1 with the walls 16 and 17 between folds 14 and 15 and 21 and 22 between folds 20 and 23 in substantial contact with each other, separating adjacent turns of the reinforcing element 11 and with the turns of the reinforcing element 11 lying within the pockets formed by the inwardly facing folds or valleys 14 and 20. It is to be noted that the folds 23 at the end section B are deeper than the fold 15 of central section A and that the loops 24 are larger than the loops 18. That comes about by reason of the differential spacing of the turns of the wire, there being a longer length of excess tubing at the end sections B than at the central section A so that the tube wall forming the folds 23 at the ends will move inwardly farther and form deeper closed end loops than the wall forming the fold 15.

After the carcass has taken the position of Fig. 1 it is removed from the water bath and permitted to cool to room temperature whereby the tube 10 will take a permanent set in the position shown in Fig. 1.

While in the illustration shown the end sections of the hose have been shown with deeper corrugations than the central section so as to render the end sections more flexible and extensible, under certain circumstances it may be desirable to make some other length of the hose more flexible and extensible than others. It is to be understood that the present invention is intended to cover such a situation. For example, if it should be desirable to make a hose more flexible at a central section than at its ends, selected turns of the coil 11 could be moved toward each end of the arbor during the forming process which would space central turns of coil 11 farther apart than the turns at the ends with the result that the central portion of the finished hose will be more flexible and extensible than the end portions.

Under certain conditions it may be desirable to make only one end of the hose more flexible in which case the turns of the reinforcing element is spaced wider apart only at one end and the clamp 35 for the other end need not be used.

The length of tubing used per coil of spring, while not exactly critical, is important. It has been found in practice that from 168 to 170 inches of unstretched tubing to 512 turns of spring is suitable to form a hose which will be satisfactory for use with a suction cleaner.

The amount the coil is extended in making a hose according to the present invention determines the length of tubing 10 which is used and also the depth of the folds or valleys which will be formed in the central section of the finished hose. It will, therefore, also determine the extent to which the finished hose may be extended. Thus, by varying the amount of stretch applied to the coil 11, the extensibility of the finished hose may be varied.

The tube walls are formed with deep corrugations in which the turns of the composite reinforcing element are effectively trapped, the turns being separated only by the walls of the tube which form the inwardly and outwardly facing valleys.

The finished hose is readily extensible, since it is only necessary that the loops of the corrugations or folds in the tube be straightened out as shown in Fig. 2 in order to extend the finished hose, there being no necessity for placing the wall of the hose under tensile stress as in previous constructions.

While the diameter of the coil, the diameter and thickness of the tube, the length of the unstretched coil and the length of the tube may vary widely for making hose of different sizes and for different purposes, the following has been found very satisfactory for making suction cleaner hose according to the present invention. The coil 10 may have an inside diameter of 1⅜" and the tube 10 an original inside diameter of 1¼" and a thickness of 0.022". A coil having an unstretched length of 39 to 40 inches may be used with an unstretched tube 170" long.

By using parts having the foregoing dimensions and the method of the present invention a hose having the following characteristics may be formed. When the carcass is removed from the arbor it will contract to approximately 100 inches. After it has been heat treated it will contract to approximately 77 inches if no compressing force is applied. When a compressing force is applied it will contract to approximately 62 inches. Such a hose, by the application of a 6-pound axial pull can be stretched to 165 inches and when the force is released it will return to a free length of 77 inches and can be compressed to a length of 62 inches for storage or other purposes.

It has been found that the following materials are satisfactory for making a hose according to the present invention suitable for use with suction cleaners. The reinforcing wire is preferably made of steel wire having a tensile strength of about 275,000 p.s.i., 0.058 inch in diameter and the sheath or coating is approximately 0.010 inch in thickness, making the diameter of the reinforcing element, 0.078 inch. The tube 10 is preferably made of an elastomeric thermoplastic such as polyvinyl chloride having a wall thickness of 0.022 to 0.026 inch and a tensile strength of 2,000 pounds per square inch at 80° F. The sheath for the wire may be made of the same material.

From the foregoing it can be seen that the present invention provides an extensible flexible hose in which all portions of the hose along its length are both flexible and extensible and in which some sections are more flexible and extensible than others. Specifically according to the foregoing disclosure the ends of the hose are more extensible and flexible than the central section to provide for the necessary greater flexibility and extensibility at the ends where necessary fittings are provided to attach the ends of the hose to the necessary appurtenances such as a suction cleaner and the necessary cleaning tools.

While I have shown and described but a single embodiment of my invention it is to be understood that that embodiment is to be taken as illustrative only and not in a limiting sense. I do not wish to be limited to the particular structure and method shown and described but wish to include all equivalent variations thereof except as limited by the scope of the claims.

I claim:

1. An extensible flexible hose comprising, a cylindrical spirally wound reinforcing coil axially tensioned so that the turns thereof tend to move toward each other when free to do so, and a thin walled tube of elastomeric thermoplastic material having a normal inside diameter less than that of said coil surrounding said coil, the wall of said tube when in its normal static unextended condition having an inwardly facing spiral fold extending the entire length thereof in which the turns of said coil are positioned and having an outwardly facing spiral fold extending the full length thereof with the walls between said folds normally lying close to each other between adjacent turns of said coil and in contact with adjacent turns of said coil so as to form substantially closed loose loops between adjacent turns of said coil and normally extending inwardly beyond the inner periphery of the turns of said coil, said loops being substantially closed between adjacent turns of said coil and being so shaped inwardly of said turns as to provide excess material in the walls of said loops which unfold when the hose is extended without stretching the material forming the walls of said loops, said outwardly facing fold being deeper and said loops being larger over at least a portion of the length of said hose whereby the hose is more flexible and extensible over that portion than along the remainder of its length, said more flexible and extensible portion being comparatively short in comparison to the length of the remainder of said hose and an attachment fitting on the interior of said hose at said more flexible and extensible portion whereby said hose may be flexed sharply about the end of said fitting without displacing the turns of said coil out of said inwardly facing fold.

2. An extensible flexible hose according to claim 1 in which said more flexible and extensible portion is positioned at at least one end of said hose.

3. An extensible flexible hose according to claim 1 in which more flexible and extensible portions are positioned at each end of said hose.

References Cited in the file of this patent

UNITED STATES PATENTS

| | | |
|---|---|---|
| 713,560 | Dodge | Nov. 11, 1902 |
| 1,547,431 | Mallory | July 28, 1925 |
| 2,430,081 | Roberts et al. | Nov. 4, 1947 |
| 2,508,774 | Roberts et al. | May 23, 1950 |
| 2,560,369 | Roberts | July 10, 1951 |
| 2,609,002 | Meissner | Sept. 2, 1952 |
| 2,715,914 | Roberts | Aug. 23, 1955 |
| 2,739,616 | Duff | Mar. 27, 1956 |

UNITED STATES PATENT OFFICE
CERTIFICATION OF CORRECTION

Patent No. 2,961,007　　　　　　　　　　　　　November 22, 1960

Frank A. Martin

It is hereby certified that error appears in the above numbered patent requiring correction and that the said Letters Patent should read as corrected below.

Column 1, line 27, after "lying" insert -- in --; line 30, strike out "in"; column 6, line 29, for "i" read -- it --.

Signed and sealed this 11th day of July 1961.

.SEAL)
.ttest:

RNEST W. SWIDER　　　　　　　　　　　　　　　DAVID L. LADD
.ttesting Officer　　　　　　　　　　　　　　　Commissioner of Patents